W. A. TURBAYNE.
SYSTEM OF ELECTRICAL DISTRIBUTION.
APPLICATION FILED JAN. 27, 1917. RENEWED MAR. 5, 1921.
1,374,043.
Patented Apr. 5, 1921.
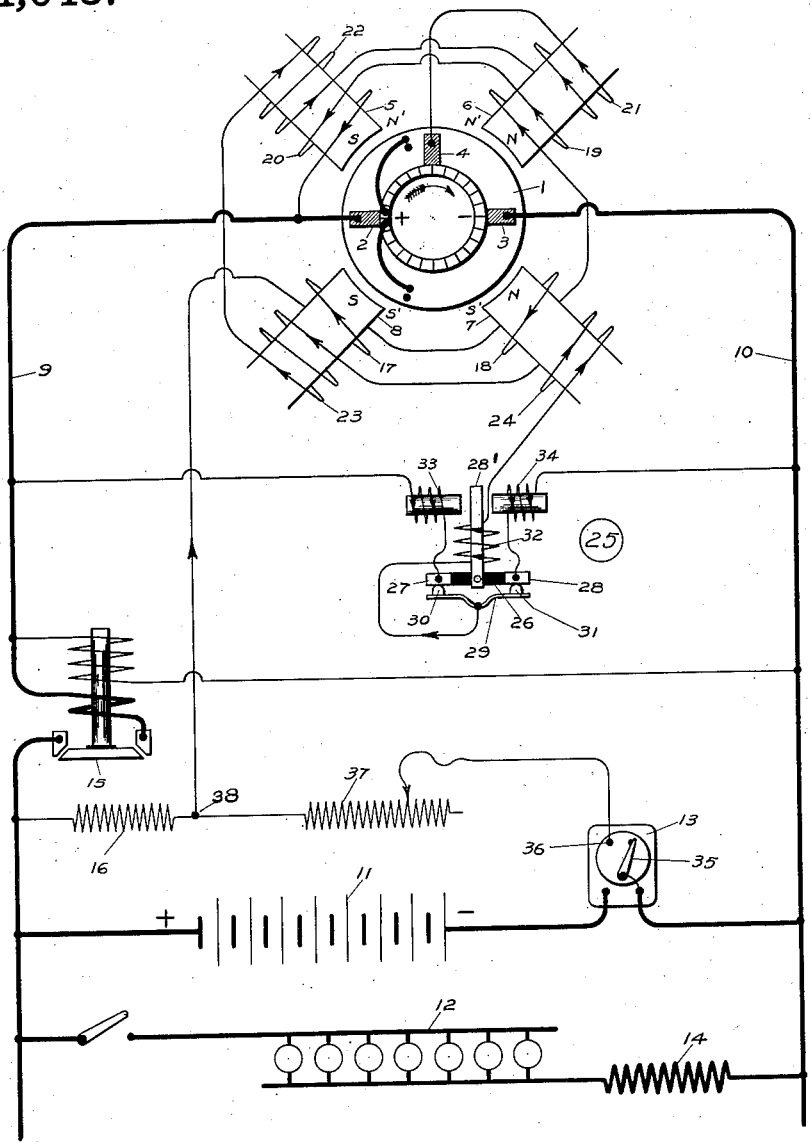
WITNESS:
Fay E Bronk.
Ralph Munden.
INVENTOR.
WILLIAM A. TURBAYNE
BY
Raymond H Van Vleet
ATTORNEY.

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

1,374,043.   Specification of Letters Patent.   Patented Apr. 5, 1921.

Application filed January 27, 1917, Serial No. 144,971. Renewed March 5, 1921. Serial No. 449,603.

*To all whom it may concern:*

Be it known that I, WILLIAM A. TURBAYNE, a citizen of the United States, residing at Niagara Falls, in the county of Niagara and State of New York, have invented new and useful Improvements in Systems of Electrical Distribution, of which the following is a specification.

The present invention relates to systems of electrical distribution.

More particularly the invention relates to systems of electrical distribution applicable to the lighting of railway cars. In such systems a variable speed generator furnishes current to supply a storage battery and a lamp circuit connected in parallel. When the generator is at rest or is developing an insufficient voltage to supply the lights, the storage battery may discharge to supply said lights. In such systems the generator is subject to reversal so that some means must be provided for maintaining the polarity of the generator unchanged.

One of the objects of the present invention is to provide a system of the kind referred to in which the number of moving parts and the amount of mechanism is reduced to a minimum.

A further object is to provide such a system in which the generator will be inherently regulated to deliver a desired output.

A further object is to provide such a system in which the output of the generator may be substantially diminished under predetermined conditions.

Further objects will be apparent as the description proceeds.

The one figure of the drawing represents diagrammatically one embodiment of the present invention. The dynamo-electric machine 1 is provided with two main brushes 2 and 3. An auxiliary brush 4 is provided, located 90 electrical degrees from the main brushes 2 and 3. The embodiment of the invention illustrated is a bipolar machine, though it has four pole pieces numbered 5, 6, 7 and 8. Though a bipolar machine is illustrated, it will be understood that the invention is not to be limited to a bipolar machine but may be embodied in a machine having any practicable number of poles.

The main brushes 2 and 3 are connected to the mains 9 and 10 respectively. Connected across the mains 9 and 10 are the storage battery 11 and the lamp circuit 12. The storage battery 11 is illustrated as having an ampere hour meter 13 connected in circuit therewith, whereby said ampere hour meter 13 will measure the current input and the current output of said battery. The lamp circuit 12 may have a regulator of any preferred construction for maintaining constant voltage on the lamps. In the main 9 there is illustrated an automatic switch 15 which will be located between the dynamo-electric machine and the storage battery 11. This automatic switch 15 may be of any preferred construction. Bridging the contacts of the automatic switch 15 is a circuit including the resistance 16 and field windings 17, 18, 19 and 20, which field windings are located on the several pole pieces of the dynamo-electric machine. Each of the pole pieces is provided with a second field winding. These second field windings, numbered 21, 22, 23 and 24 are connected in series with the auxiliary brush 4.

A field selector switch is indicated as a whole by the numeral 25. Said field selector switch 25 is provided with an insulating rocking contact member 26 provided with contacts 27 and 28. The movement of the contact member 26 is controlled by the magnetic member 28', which is fixed thereto. The spring yoke member 29 carries two contacts 30 and 31, which are adapted to engage with contacts 27 and 28' respectively. The magnetic member 28 is adapted to be magnetized by the coil 32. Coils 33 and 34 are located on opposite sides of the magnetic member 28 and are adapted to coöperate with the coil 32 to control the position of the magnetic member 28' in a manner which will be described more fully hereinafter. Circuit may be traced from the auxiliary brush 4, through the windings 21, 22, 23 and 24, coil 32 of the field selector switch to the yoke member 29. From the yoke member 29, the circuit divides, one half going through contacts 31, 28 and coil 34 to the main 10, while the other half goes through contact 30, contact 27 and coil 33 to the main 9.

The ampere hour meter 13, which is located in the battery branch, may be of any preferred construction, but should be of the type which automatically changes its rate of registration upon reversal of current flow therethrough. Said ampere hour meter may be calibrated to compensate for the losses in the storage battery whereby to register the net state of charge of said storage battery at all times. Said ampere hour meter 13 is provided with a movable contact 35 and a fixed contact 36. The movable contact 35 is illustrated as being connected to the main 10. The fixed contact 36 is illustrated as being connected through the adjustable resistance 37 to a point 38 between the resistance 16 and the field circuit including windings 17, 18, 19 and 20. It will be clear that when movable contact 35 engages fixed contact 36, the field windings 17, 18, 19 and 20 will be connected across main brushes 2 and 3 of the dynamo-electric machine through adjustable resistance 37.

The drawing illustrates conditions existing when the armature 1 just commences to rotate, previous to the actuation of the field selector switch 25. At this time, of course, the automatic switch 15 will be open. Under this condition current will flow from the positive pole of the storage battery 11 through resistance unit 16, around the field windings 17, 18, 19 and 20, in the direction indicated by the arrows; thence through the armature 1, which at this period develops only a small voltage, back to the negative pole of the storage battery. This small magnetizing current will make the two upper poles 5 and 6 north poles, as indicated by the characters N', and the two lower poles 7 and 8 south poles, as indicated by the characters S'. Rotation of the armature 1 in this field will develop an E. M. F. effective on brushes 4 and 2, brush 2 being positive and brush 4, negative. The said rotation will also develop an E. M. F. effective on brushes 3 and 4, brush 3 being positive and brush 4, negative. Consequently, a magnetizing current will pass through brush 2, coil 33 on the field selector switch, and contacts 27 and 30, to the coil 32. Current will also pass from the brush 3 through coil 34 on the field selector switch, contacts 28 and 31, to the coil 32. From the coil 32 circuit may be traced through windings 24, 23, 22 and 21 to the auxiliary brush 4. This magnetizing current, flowing through the field windings, will make the two left hand poles 5 and 8 south poles, as indicated by the characters S, and the right hand poles 6 and 7 north poles, as indicated by the characters N, so that now an E. M. F. will be developed across brushes 2 and 3. Current will now pass from the brush 2 through coil 33 of the field selector switch, through contacts 27 and 30, yoke 29, contacts 31, 28, through coil 34 to the brush 3 of the dynamo-electric machine. The E. M. F. that initially directed a current through coil 34, will be overcome, so that now the coils 33 and 34 will operate cumulatively. Coöperation of the coils 32, 33 and 34 will throw the field selector switch 25 in a counter-clockwise direction whereby contact will be opened between contacts 28 and 31, whereas contacts 27 and 30 will be more firmly engaged. Thereafter, while the armature continues to rotate in the direction indicated by the arrow, the field windings 24, 23, 22 and 21 will be connected across main brush 2 and auxiliary brush 4.

Upon the attainment of the necessary speed, sufficient voltage will be developed across brushes 2 and 3 to cause closure of the automatic switch 15, connecting the battery and work circuit across these brushes. When the automatic switch closes, resistance 16 and coils 17, 18, 19 and 20 will be short-circuited and removed from effective coöperation with the other elements.

Current in the armature 1 through brushes 2 and 3 will develop a magnetic flux in a vertical direction at right angles to the horizontal flux imparted by coils 21, 22, 23, 24. This armature flux will tend to make the upper poles 5 and 6 south poles and the lower poles 7 and 8 north poles. This quadrature flux, therefore, will act to raise the potential of auxiliary brush 4, so that any tendency to increase the current supplied to the outside circuit, brought about for instance by increase of speed, will be compensated for by a reduced E. M. F. across brushes 2 and 4, across which the main field windings are connected. As a consequence of this reduction in the E. M. F. across the main field windings, the output of the dynamo-electric machine will be effectually controlled.

It will be clear that, if the armature 1 should start up in a direction opposite to that indicated by the arrow, the polarities of windings 21, 22, 23 and 24 will be reversed, whereby the right hand poles 6 and 7 will now be south poles and the left hand poles 5 and 8 will be north poles, which, with the reverse direction of rotation will cause main brushes 2 and 3 to be of unchanged polarity. Current in the coil 32 of the field selector switch will be reversed, whereby the field selector switch will now be thrown in a clock-wise direction whereby the main field windings 21, 22, 23 and 24 will now be connected across auxiliary brush 4 and main brush 3. The armature flux will operate in a manner similar to that described above for controlling the current output of the dynamo-electric machine.

After a certain number of ampere hours have been supplied to the storage battery 11, contacts of the ampere hour meter 13 will engage and circuit will be reëstablished in the field windings 17, 18, 19 and 20 but in a reverse direction from that indicated by the arrow heads which show the current direction when the machine is at rest or just commencing to rotate. When the ampere hour meter contacts close, current will flow from the positive brush 2, through coils 20, 19, 18 and 17, in the order mentioned, adjustable resistance 37, fixed contact 36, movable contact 35, main 10 and negative brush 3. Current will also pass through the automatic switch 15 and resistance 16 and combine with the other current through adjustable resistance 37. This reversed current through coils 17, 18, 19 and 20 will assist armature reaction to further reduce the E. M. F. developed across brushes 2 and 4 and cause a reduction in the main field current. By manipulation of the adjustable resistance 37 the output may be controlled, whereby the battery may be caused to substantially float across the generator brushes.

The present invention has been illustrated with an ampere hour meter in circuit with the storage battery to determine when the reduction in the generator output shall occur. Any other preferred means may be used for closing the contact at some predetermined condition. Many other modifications will occur to those skilled in the art. It is intended that the patent shall cover all such modifications that fall within the scope of the invention as defined by the appended claims.

What I claim as new and desire to secure by Letters Patent of the United States is:—

1. In combination, a generator field winding for setting up a field of flux, main field windings located substantially 90 electrical degrees from said first winding, an armature, means whereby said first mentioned winding will have a fixed polarity regardless of the direction of armature rotation while said armature is picking up, and means whereby the polarity of said first mentioned winding may be reversed upon the attainment of predetermined conditions.

2. In combination, a dynamo-electric machine having $n$ pole pieces, an armature, a field circuit including windings on all said pole pieces wound to produce $\frac{n}{2}$ poles and a second field circuit including windings on all said pole pieces wound to produce $\frac{n}{2}$ poles displaced from the first mentioned poles ninety electrical degrees, means whereby said first mentioned windings will have a fixed polarity regardless of the direction of armature rotation while said machine is picking up, means for rendering said first mentioned field circuit inoperative under predetermined conditions, and means for rendering said first mentioned circuit operative to set up a differential field flux under certain other predetermined conditions.

3. In combination, a variable speed generator having $n$ pole pieces and a pair of field circuits, each including windings on all of said pole pieces, said generator having main brushes and an auxiliary brush located ninety electrical degrees from said main brushes, a storage battery, one of said field circuits being adapted to insure constant polarity of said generator regardless of reversals of rotation and the other circuit being connected across one of said main brushes and said auxiliary brush whereby to respond to armature reaction for regulating purposes, and means for connecting said first mentioned circuit across said main brushes for aiding armature reaction.

4. In combination, a variable speed generator having $n$ pole pieces, means coöperating with said pole pieces for insuring constant polarity of said generator regardless of reversals of rotation, other means coöperating with each of said pole pieces for exciting said generator as an $\frac{n}{2}$ pole machine, and means responsive to predetermined conditions for causing said first mentioned means to aid armature reaction in reducing the output of said generator.

5. In combination, a variable speed generator having $n$ pole pieces, a field circuit including windings on all said pole pieces for exciting said generator as an $\frac{n}{2}$ pole machine, a second circuit including windings on all said pole pieces for setting up magneto-motive force in quadrature to that set up by the first mentioned circuit, and means whereby said second circuit may either insure constant polarity of said generator, or aid armature reaction to reduce the output of said generator.

6. In combination, a variable speed reversible generator having main brushes and an auxiliary brush, a field circuit and selective means responsive to a function of said generator for connecting said field circuit between said auxiliary brush and either of the main brushes.

7. In combination, a variable speed reversible generator having main brushes and an auxiliary brush, a field circuit, the direction of current in which is responsive to the direction of rotation of said generator, and means responsive to the direction of current flow in said field circuit for connecting said field circuit between said auxiliary brush and either of said main brushes.

8. In combination, a variable speed generator having main brushes and an auxiliary brush, a field circuit adapted to be connected between said auxiliary brush and one of said main brushes whereby armature reaction will limit the generator output, a supplementary field circuit, and means responsive to predetermined conditions for causing a reversal in the direction of current flow through said supplementary field circuit.

9. In combination, a variable speed reversible generator having main brushes and an auxiliary brush located ninety electrical degrees from said main brushes, a field circuit having, on starting, a certain definite polarity, another field circuit whose polarity is determined by the direction of rotation of said generator, and means responsive to the direction of current flow in said second mentioned field circuit for automatically connecting said second mentioned field winding between said auxiliary brush and either of said main brushes.

10. In combination, a variable speed reversible generator, having main brushes and an auxiliary brush located ninety electrical degrees from said main brushes, a field circuit having on starting a certain definite polarity, another field circuit adapted to produce field flux in quadrature to that produced by the first mentioned field circuit, means responsive to the direction of current flow in said second mentioned field circuit for controlling the connections of said second mentioned field circuit, and means responsive to predetermined conditions for connecting said first mentioned field circuit to aid armature reaction for regulating purposes.

11. In combination, a variable speed generator, having main brushes and an auxiliary brush angularly displaced from said main brushes, a field circuit having, on starting, a certain definite polarity, another field circuit adapted to produce field flux in quadrature to that produced by the first mentioned field circuit, and means responsive to predetermined conditions for connecting said first mentioned field circuit to aid armature reaction for regulating purposes.

12. In combination, a variable speed generator having main brushes and an auxiliary brush, means for causing a difference in polarity to exist between said auxiliary brush and one of said main brushes, main field windings, and means responsive to the direction of armature rotation for selectively connecting said main field windings between said auxiliary brush and one or the other of said main brushes.

13. In combination, a dynamo-electric machine having an armature, field poles provided with windings, said poles being adapted to set up fields having their axes spaced substantially 90 electrical degrees apart, main brushes connected to said armature at substantially the points of maximum potential difference, due to rotation in one of said fields, an auxiliary brush located substantially 90 electrical degrees from said main brushes, and switch means for selectively connecting certain of said field windings between said auxiliary brush and one or the other of said main brushes.

14. In combination, a storage battery, a dynamo-electric machine having main field windings, auxiliary windings adapted to set up a field of flux spaced substantially 90 electrical degrees from the field set up by said main field windings, main brushes placed substantially at points of maximum potential due to armature rotation, an auxiliary brush spaced 90 electrical degrees from said main brushes, and selective means for completing circuit between said auxiliary brush and one or the other of said main brushes.

15. In combination, main field windings, an armature, auxiliary field windings spaced 90 electrical degrees from said main field windings, main brushes located substantially at points of maximum potential difference, due to armature rotation in the field of flux set up by said main field windings, an auxiliary brush spaced substantially 90 electrical degrees from said main brushes, a storage battery, and means responsive to predetermined conditions for causing a reversal of current through said auxiliary windings.

16. In combination, an armature, main and auxiliary field windings, said auxiliary windings being energized to produce flux of constant polarity regardless of the direction of armature rotation, main brushes and an auxiliary brush, said main field windings being adapted to be connected between said auxiliary brush to one or another of said main brushes in response to the direction of armature rotation.

In witness whereof, I have hereunto subscribed my name.

WILLIAM A. TURBAYNE.